(12) United States Patent
Kim

(10) Patent No.: US 11,630,476 B2
(45) Date of Patent: Apr. 18, 2023

(54) FOLDABLE PEDAL APPARATUS FOR VEHICLES

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/699,883

(22) Filed: Mar. 21, 2022

(65) Prior Publication Data
US 2023/0024609 A1    Jan. 26, 2023

(30) Foreign Application Priority Data

Jul. 22, 2021 (KR) .................. 10-2021-0096518

(51) Int. Cl.
| | | |
|---|---|---|
| G05G 1/30 | (2008.04) | |
| G05G 1/40 | (2008.04) | |
| B60K 26/02 | (2006.01) | |
| G05G 5/05 | (2006.01) | |
| B60T 7/04 | (2006.01) | |
| G05G 1/38 | (2008.04) | |

(52) U.S. Cl.
CPC .............. G05G 1/40 (2013.01); B60K 26/02 (2013.01); B60T 7/042 (2013.01); G05G 1/38 (2013.01); G05G 5/05 (2013.01); *B60K 2026/026* (2013.01)

(58) Field of Classification Search
CPC .. G05G 1/30; G05G 1/32; G05G 1/36; G05G 1/38; G05G 1/40; G05G 1/405; G05G 1/44; G05G 1/445; G05G 5/005; G05G 5/05; B60R 21/09; B60T 7/04; B60T 7/06; B60T 7/042; B60K 26/02; B60K 26/021; B60K 2026/021; B60K 2026/024; B60K 2026/026
See application file for complete search history.

(56) References Cited

U.S. PATENT DOCUMENTS

| | | | | |
|---|---|---|---|---|
| 3,059,960 | A * | 10/1962 | Komorowski | G05G 1/40 296/75 |
| 6,182,525 | B1 * | 2/2001 | Bowers | B60K 23/02 180/274 |
| 7,066,048 | B2 * | 6/2006 | Sauvonnet | G05G 1/405 74/512 |
| 10,906,514 | B1 * | 2/2021 | Kim | G05G 5/03 |
| 10,946,741 | B1 * | 3/2021 | Kim | B60T 7/06 |

(Continued)

FOREIGN PATENT DOCUMENTS

| | | |
|---|---|---|
| KR | 2017-0137427 A | 12/2017 |
| WO | WO-2021182563 A1 * | 9/2021 |

OTHER PUBLICATIONS

Machine Translation of WO 2021/182563.*

*Primary Examiner* — Brian J McGovern
(74) *Attorney, Agent, or Firm* — Fox Rothschild LLP

(57) ABSTRACT

A foldable pedal apparatus for vehicles is provided in which pedal pads are rotated rearwards from a footrest panel and thus enter a pop-up state to be manipulable by a driver in a manual driving mode in which the driver directly drives a vehicle. The pedal pads are rotated forwards maximally close to the front surface of the footrest panel and thus enter a hidden state without exposure to be nonmanipulable by the driver in an autonomous driving situation.

17 Claims, 16 Drawing Sheets

(56) References Cited

U.S. PATENT DOCUMENTS

| | | | |
|---|---|---|---|
| 10,994,611 B1* | 5/2021 | Kim | G05G 5/28 |
| 11,021,058 B1* | 6/2021 | Kim | G05G 5/28 |
| 11,225,226 B1* | 1/2022 | Kim | B60T 7/042 |
| 11,249,506 B1* | 2/2022 | Kim | G05G 5/28 |
| 11,312,236 B1* | 4/2022 | Kim | B60T 7/065 |
| 11,327,520 B1* | 5/2022 | Kim | G05G 5/05 |
| 2005/0011493 A1* | 1/2005 | Reimann | B60K 26/021 |
| | | | 74/513 |
| 2009/0223319 A1* | 9/2009 | Choi | G05G 1/36 |
| | | | 74/512 |
| 2015/0107402 A1* | 4/2015 | Leem | G05G 5/03 |
| | | | 74/512 |
| 2017/0225570 A1* | 8/2017 | El Aile | B60R 21/203 |
| 2019/0310678 A1* | 10/2019 | Wojciechowski | B60K 26/021 |
| 2020/0317167 A1* | 10/2020 | Ghaffari | B60T 7/06 |
| 2021/0004040 A1* | 1/2021 | Dohmen | G05G 1/42 |
| 2021/0170988 A1* | 6/2021 | Villalva Sanchez | B60R 21/09 |
| 2021/0284106 A1* | 9/2021 | Kim | B60T 7/06 |
| 2021/0331584 A1* | 10/2021 | Kim | G05G 1/40 |
| 2021/0394798 A1* | 12/2021 | Kim | B60T 7/12 |
| 2022/0001843 A1* | 1/2022 | Michael | G05G 1/60 |
| 2022/0011806 A1* | 1/2022 | Miletto | B60K 23/02 |
| 2022/0048384 A1* | 2/2022 | Kim | G05G 5/28 |
| 2022/0055477 A1* | 2/2022 | Kim | G05G 1/44 |

* cited by examiner

FOLDABLE PEDAL APPARATUS FOR VEHICLES

CROSS-REFERENCE TO RELATED APPLICATION

This application claims priority from Korean Patent Application No. 10-2021-0096518, filed on Jul. 22, 2021, the disclosure of which is incorporated herein by reference in its entirety.

BACKGROUND OF THE INVENTION

1. Field of the Invention

The present invention relates to a foldable pedal apparatus for vehicles, and more particularly, to a foldable pedal apparatus for vehicles in which pedal pads protrude towards a driver to be exposed to the driver to be operated by the driver in a manual driving mode in which the driver directly drives a vehicle, and the pedal pads are hidden not to be exposed to the driver to prevent driver operation in an autonomous driving mode.

2. Description of the Related Art

An autonomous vehicle is a smart vehicle, to which autonomous driving technology allowing a vehicle to autonomously reach a destination without driver's direct operation of a steering wheel, an accelerator pedal, a brake pedal, etc. is applied, and development of autonomous vehicles is progressing rapidly.

In general, if an autonomous driving situation is universally implemented, one is selected from a manual driving mode in which a driver directly drives a vehicle and an autonomous driving mode in which the vehicle autonomously reaches a destination without driver's direct driving of the vehicle.

In the autonomous driving mode, the driver may comfortably rest while stretching out his or her legs, and thus, when pedals (e.g., an accelerator pedal and a brake pedal) located in a space under a driver's seat remain exposed to the interior of the vehicle, these pedals disturb driver's rest and may also be inadvertently operated by the driver.

Further, the autonomous driving situation indicates a situation in which the driver does not operate the pedals of the vehicle, and thus, when the driver either advertently or inadvertently operates the pedals during autonomous driving, a vehicle controller terminates autonomous driving, determines a driver intention to directly operate the vehicle, and thus terminates control for autonomous driving.

However, if the pedals of the vehicle are installed to be exposed into the space under the driver's seat, there is a possibility that the driver would unconsciously or inadvertently operate the pedals in the autonomous driving mode (i.e., erroneous operation of the pedals), and in this case, an accident may occur depending on a road condition, a distance between vehicles, or the like.

Therefore, development of technology, related to a pedal apparatus in which pedal pads protrude towards a driver to be exposed to the driver to be operated by the driver in the manual driving mode, and the pedal pads are hidden not to be exposed to the driver to prevent the driver operation in the autonomous driving mode and thus to achieve driver's comfortable rest and to prevent erroneous operation of the pedal pads, is required.

The above information disclosed in the section is merely for enhancement of understanding of the background of the invention and should not be interpreted as conventional technology that is already known to those skilled in the art.

SUMMARY OF THE INVENTION

Therefore, the present invention provides a foldable pedal apparatus for vehicles in which pedal pads protrude towards a driver and are thus exposed (popped up) to the driver to be operated by the driver in a manual driving mode in which the driver directly drives a vehicle, and the pedal pads are hidden (shielded) and are thus not exposed to the driver not to be operated by the driver in an autonomous driving situation, to enable the driver to comfortably rest in the autonomous driving situation and to promote safety improvement through interruption of erroneous operation of pedals in the autonomous driving situation.

It is another object of the present invention to provide a foldable pedal apparatus for vehicles in which a space configured to hide the pedal apparatus in the hidden state thereof may be minimized, and thereby, the space of the interior of a vehicle and the space of an engine compartment may be maximally assured.

It is yet another object of the present invention to provide a foldable pedal apparatus for vehicles in which no holes connected to an engine compartment are formed in a footrest panel to install and operate the foldable pedal apparatus, and thereby, inflow of noise and foreign substances and penetration of moisture into the interior of a vehicle may be maximally prevented.

In accordance with the present invention, the above and other objects can be accomplished by the provision of a foldable pedal apparatus for vehicles, including pedal pads rotatably combined with a footrest panel, rotated towards a front surface of the footrest panel to enter a hidden state, in which the pedal pads are nonmanipulable by a driver, in an autonomous driving situation, and rotated rearwards to enter a pop-up state, in which the pedal pads are exposed to the driver to be manipulable by the driver, in a manual driving mode, link units configured to connect the pedal pads to the footrest panel and rotated together with the pedal pads, and actuators fixed to the footrest panel, operated to come into contact with the link units or to release contact with the link units, and configured to rotate the pedal pads towards the front surface of the footrest panel to allow the pedal pads to enter the hidden state when the actuators are operated to come into contact with the link units.

The foldable pedal apparatus for vehicles may further include return springs installed with both ends supported by the footrest panel and the pedal pads, and configured to provide spring force to the pedal pads to rotate the pedal pads rearwards and thus to enter the pop-up state.

Two pedal devices having the same configuration, each pedal device including one of the pedal pads, one of the link units, one of the actuators and one of the return springs, may be installed on the footrest panel to be laterally spaced apart from each other. A first of the two pedal devices installed on the footrest panel to be laterally spaced apart from each other may be used as an accelerator pedal device, and a second of the two pedal devices may be used as a brake pedal device. Each of the pedal pads may be an organ-type pedal pad provided with a lower end rotatably combined with the footrest panel via a hinge pin, a portion located above the hinge pin to be connected to a corresponding one of the return springs, and an upper end rotated forwards and rearwards about the hinge pin.

Each of the link units may include a first link rotatably combined with the footrest panel via a first link pin, second links rotatably combined with an upper end of a corresponding one of the pedal pads via a second link pin, and a connection pin configured to rotatably connect the first link and the second links, and when the first link and the second links are rotated to be folded towards each other, the corresponding one of the pedal pads is rotated towards the front surface of the footrest panel and thus enters the hidden state, and when the first link and the second links are rotated to be unfolded from each other, the corresponding one of the pedal pads is rotated rearwards and thus enters the pop-up state.

The second links of each of the link units may include two second links provided at both sides of the first link and connected to the corresponding one of the pedal pads via the second link pin and a connection pin. Each of the actuators may include a linear motor provided with a motor rod fixedly installed on the footrest panel to be moved forwards and rearwards, and a foldable guide connected to the motor rod and configured to come into contact with the first link when the motor rod is moved rearwards and to release contact with the first link when the motor rod is moved to protrude.

When the foldable guide is moved rearwards and thus come into contact with the first link, the first link and the second links may be rotated so as to be folded towards each other, and the corresponding one of the pedal pads may be rotated towards the front surface of the footrest panel and thus enters the hidden state. When the foldable guide is moved forwards and thus contact of the foldable guide with the first link is released, the corresponding one of the pedal pads may be rotated about the hinge pin by spring force of a corresponding one of the return springs to protrude rearwards and thus enters the pop-up state.

A guide groove configured to extend in a length direction of the pedal pads may be formed in the front surface of each of the pedal pad, and one end of the foldable guide may be inserted into the guide groove so that the guide groove guides rectilinear movement of the foldable guide. Panel recesses configured to protrude forwards and to be open rearwards may be formed in the front surface of the footrest panel, the linear motor may be fixedly installed to be inserted into each of the panel recesses, and when the pedal pads are in the hidden state, the first link, the second links and the foldable guide may be inserted into each of spaces between the panel recesses and the panel pads so as not to be exposed. When the pedal pads are in the hidden state, the panel recesses may be shielded by the pedal pads so as not to be exposed.

A stopper may be provided at a lower end of each of the pedal pads, and when the pedal pads are in the pop-up state, a pop-up position of each of the pedal pads may be determined by contact between the stopper and the footrest panel. The foldable pedal apparatus for vehicles may further include permanent magnets combined with the respective pedal pads, and printed circuit boards (PCBs) fixedly installed on the footrest panel so as to face the permanent magnets, and each of the PCBs may be configured to detect a rotating angle of a corresponding one of the pedal pads through a magnetic flux change of the permanent magnets when the pedal pads are rotated, and generate a signal related to pedal functions.

When positions of the permanent magnets are changed while rotating the pedal pads to enter the hidden state or the pop-up state by operating the actuators, the PCBs may not generate the signal related to the pedal functions in order to prevent erroneous operation. When the positions of the permanent magnets are changed due to rotation of one of the pedal pads by driver operation in a situation in which the linear motors are not operated in the pop-up state of the pedal pads, a corresponding one of the PCBs may generate the signal related to the pedal functions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
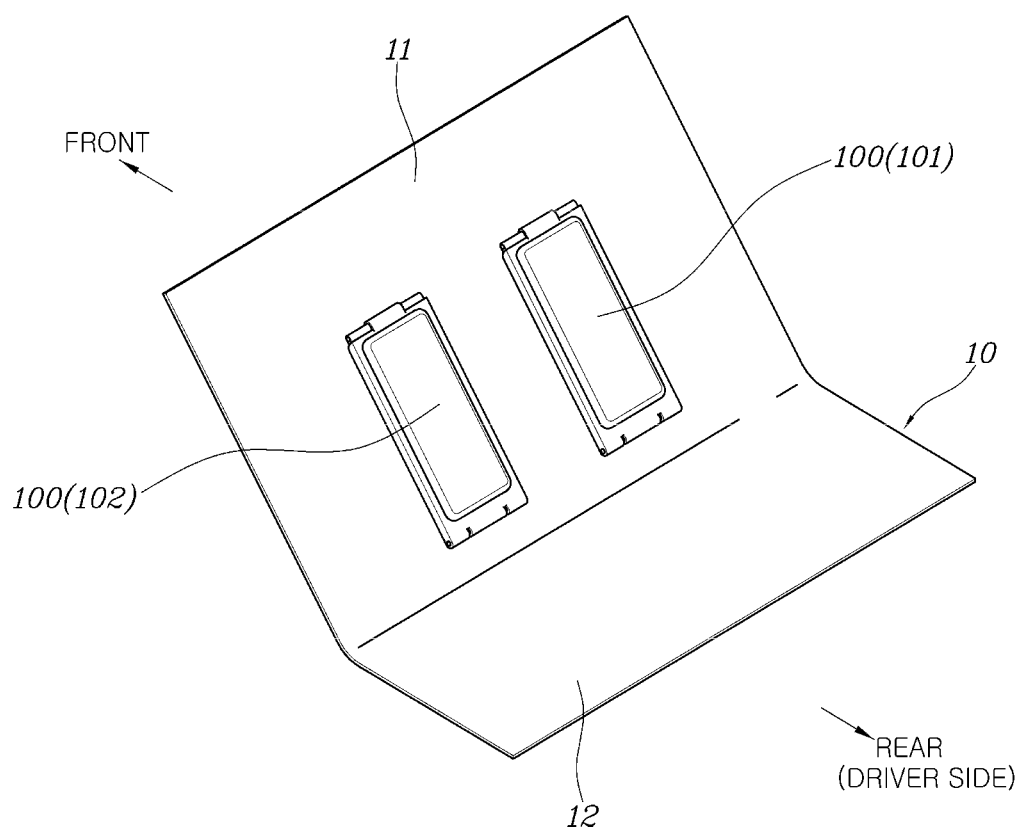
FIG. 1 is a perspective view of a foldable pedal apparatus for vehicles according to the present invention in a hidden state.
Figure 2:
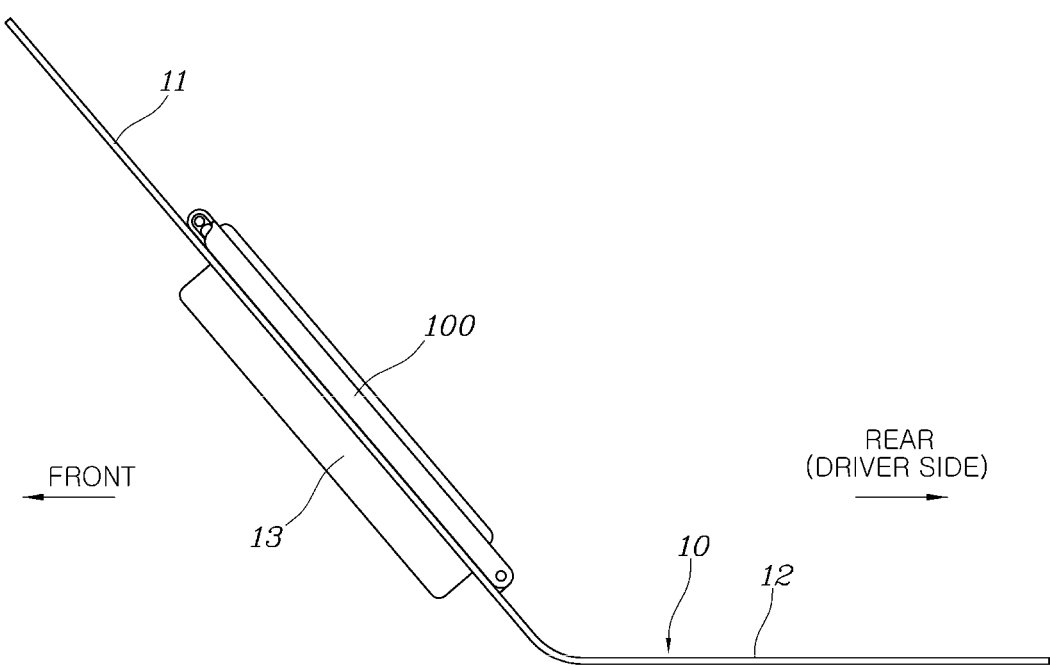
FIG. 2 is a side view of FIG. 1.
Figure 3:
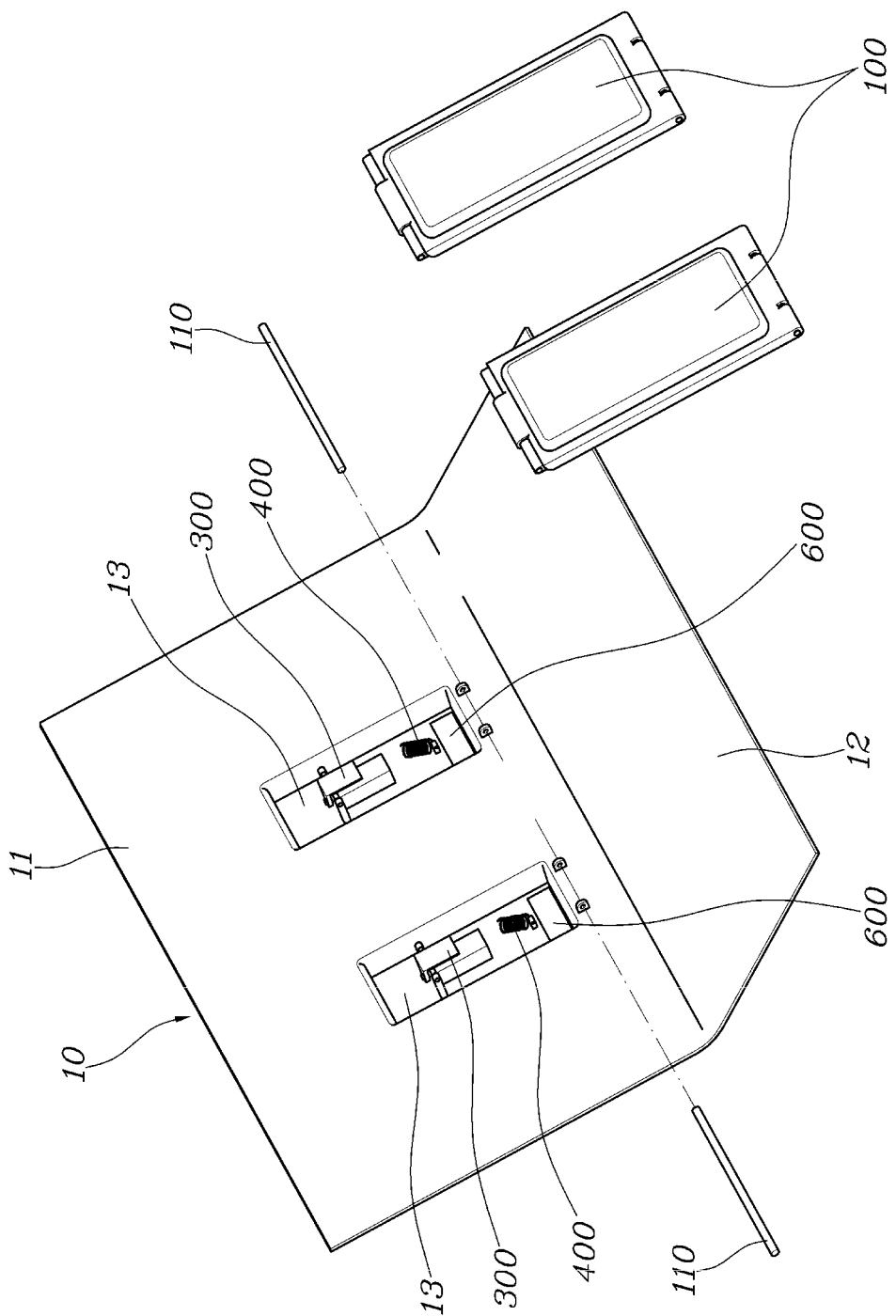
FIG. 3 is a perspective view of FIG. 1 illustrating a state in which pedal pads are separated from the foldable pedal apparatus.
Figure 4:
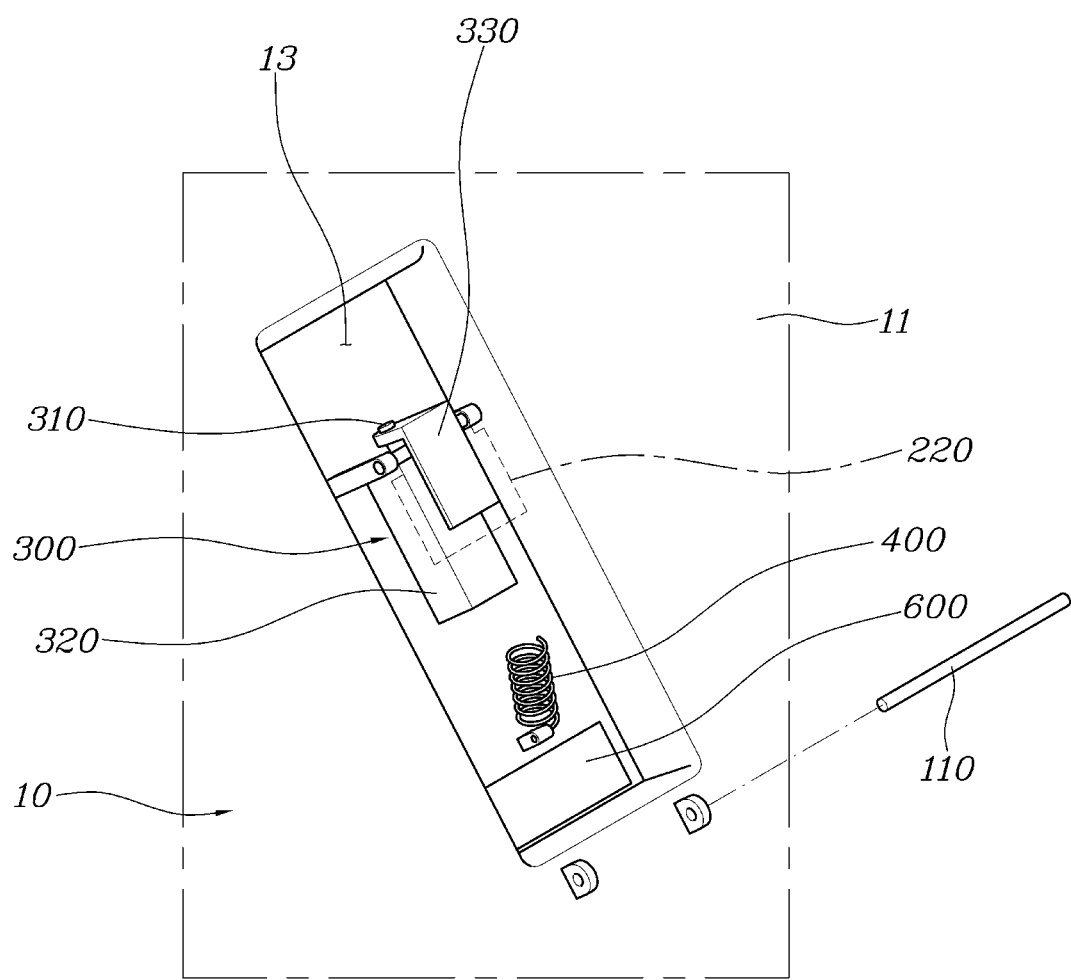
FIG. 4 is an enlarged view of FIG. 3.
Figure 5:
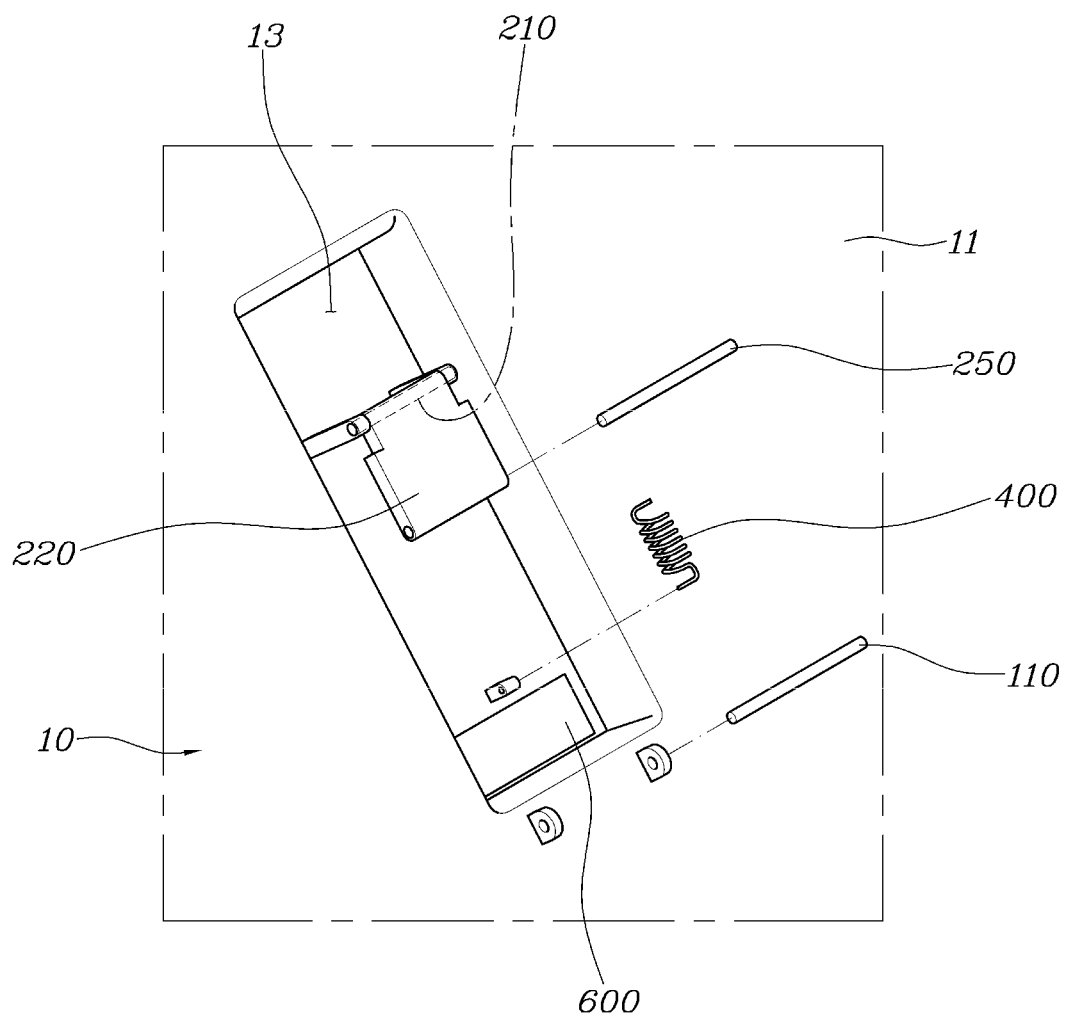
FIG. 5 is a perspective view illustrating a state in which a first link is combined with a footrest panel according to the present invention.
Figure 6:
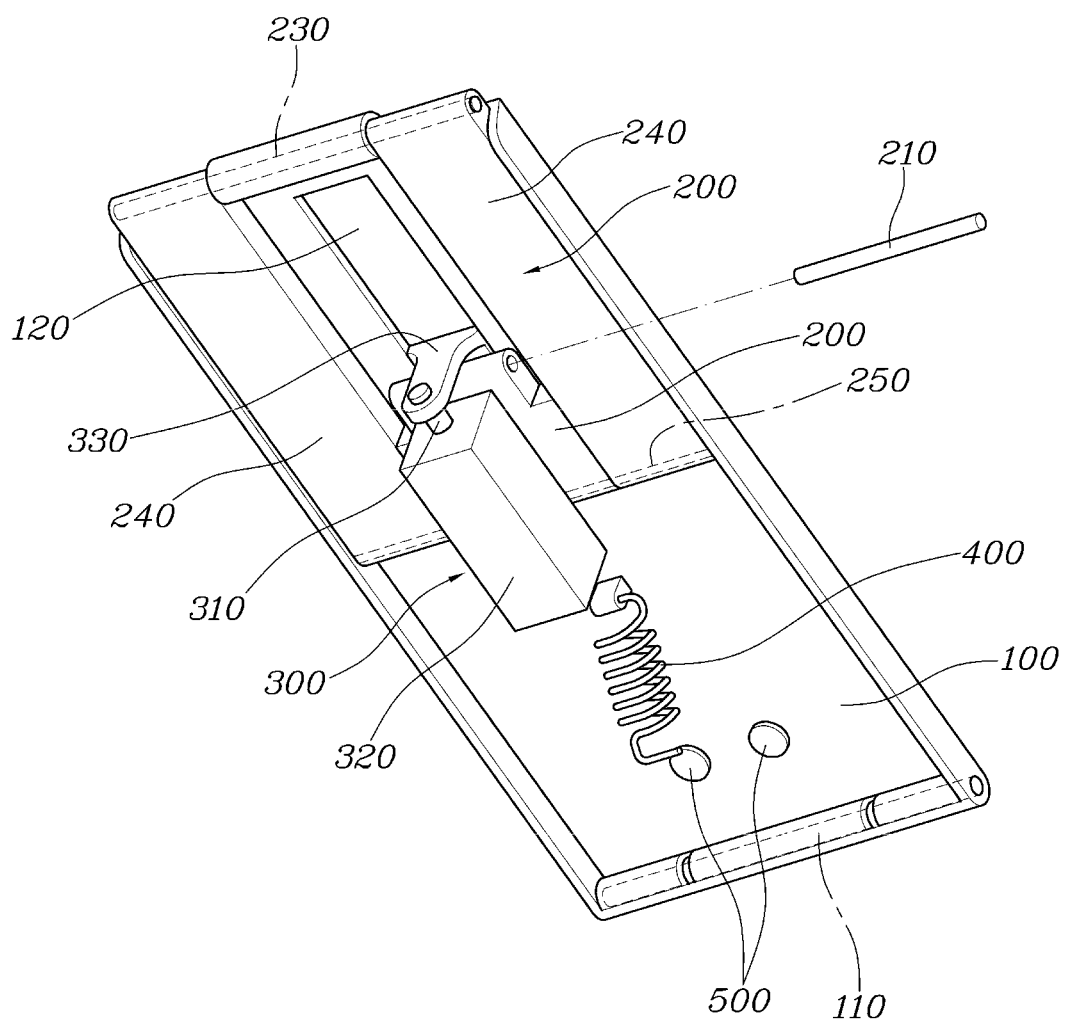
FIG. 6 is a perspective front view of the pedal pad of FIG. 3.
Figure 7:
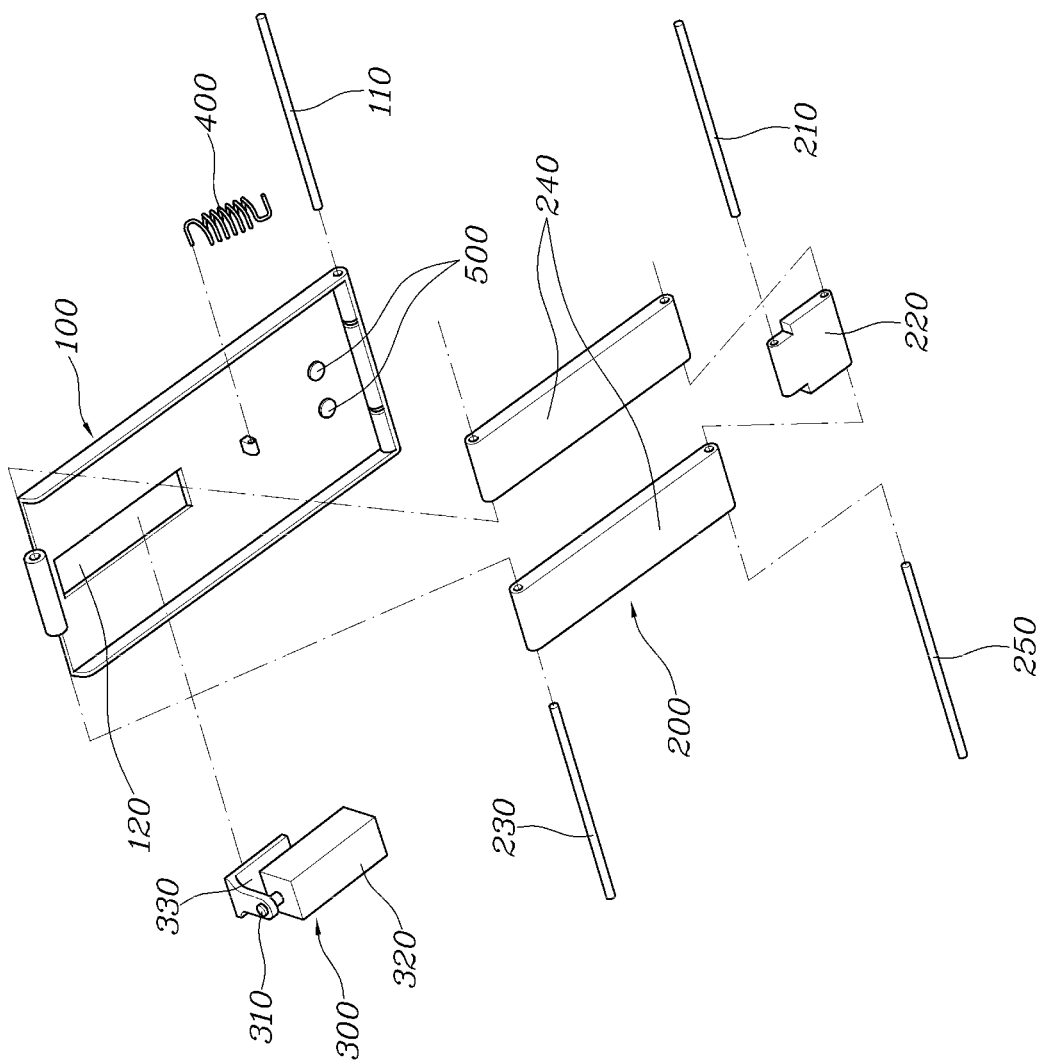
FIG. 7 is an exploded perspective view of FIG. 6.
Figure 8:
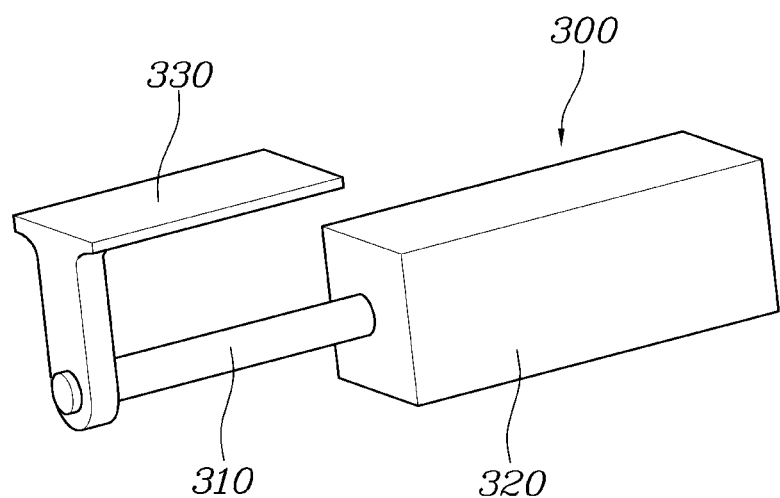
FIG. 8 is a perspective view of an actuator according to the present invention.
Figure 9:
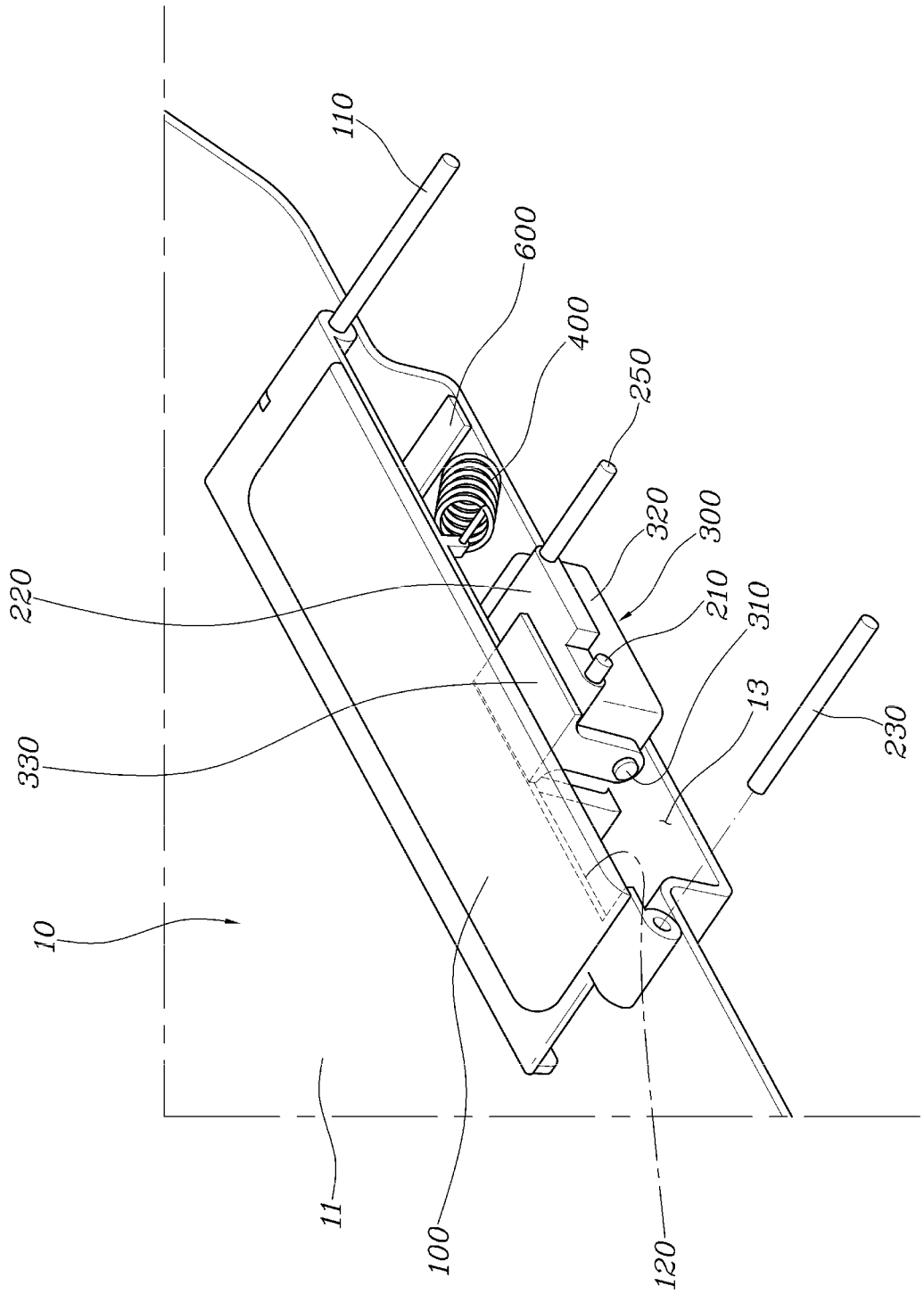
FIG. 9 is a cross-sectional view of the pedal pad in the hidden state.
Figure 10:
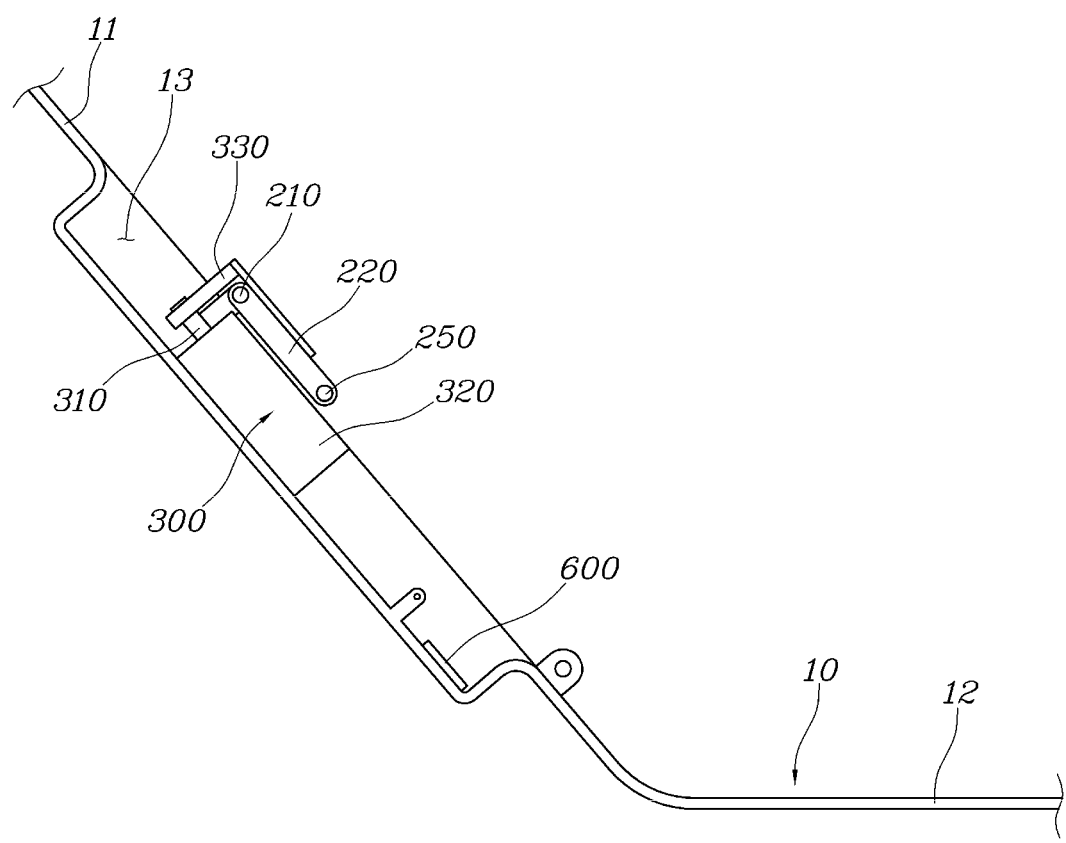
FIG. 10 is a side view the footrest panel of FIG. 9, illustrating a state in which the pedal pad is removed.

Specific structural or functional descriptions in embodiments of the present invention set forth in the description which follows will be exemplarily given to describe the embodiments of the present invention. However, the present invention may be embodied in many alternative forms, and should not be construed as being limited to the embodiments set forth herein.

The embodiments of the present invention may be variously modified and changed, and thus specific embodiments of the present invention will be illustrated in the drawings and described in detail in the following description of the embodiments of the present invention. However, it will be understood that the embodiments of the present invention are provided only to completely disclose the invention and cover modifications, equivalents or alternatives which come within the scope and technical range of the invention.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

A control unit (controller) according to an exemplary embodiment of the present invention may be implemented through a non-volatile memory (not shown) configured to store an algorithm configured to control operations of various elements of the vehicle or data regarding software commands for reproducing the algorithm and a processor (not shown) configured to perform operations which will be described below using data stored in the corresponding memory. The memory and the processor may be implemented as individual chips. Alternatively, the memory and the processor may be implemented as a single integrated chip. Here, the processor may be provided in the form of one or more processors.

Hereinafter, a foldable pedal apparatus for vehicles according to an exemplary embodiment of the present invention will be described with reference to the accompanying drawings.

A foldable pedal apparatus for vehicles according to the present invention includes, as shown in FIGS. 1 to 16, pedal pads 100 rotatably combined with a footrest panel 10, rotated towards a front surface 11 of the footrest panel 10 to enter a hidden state, in which the pedal pads 100 are nonmanipulable by a driver, in an autonomous driving situation, and rotated rearwards to enter a pop-up state, in which the pedal pads 100 are exposed to the driver to be manipulable by the driver, in a manual driving mode, link units 200 configured to connect the pedal pads 100 to the footrest panel 10 and rotated together with the pedal pads 100, and actuators 300 fixed to the footrest panel 10, operated to come into contact with the link units 200 or to release contact with the link units 200, and configured to rotate the pedal pads 100 towards the front surface 11 of the footrest panel 10 to allow the pedal pads 100 to enter the hidden state when the actuators 300 are operated to come into contact with the link units 200.

The footrest panel 10 may include a bottom surface 12 pressed against the floor of a vehicle body, and the front surface 11 configured to extend forwards and upwards from the front end of the bottom surface 12 to be inclined. In the foldable pedal apparatus for vehicles according to the present invention, when the pedal pads 100 are rotated forwards and are thus located maximally close to the front surface 11 of the footrest panel 10 by operating the actuators 300, exposure of the pedal pads 100 to the driver is interrupted and thus the pedal pads 100 maintain the hidden state, in which the pedal pads 100 are nonmanipulable by the driver (with reference to FIGS. 1 and 2 and FIGS. 11 and 12).

Figure 13:
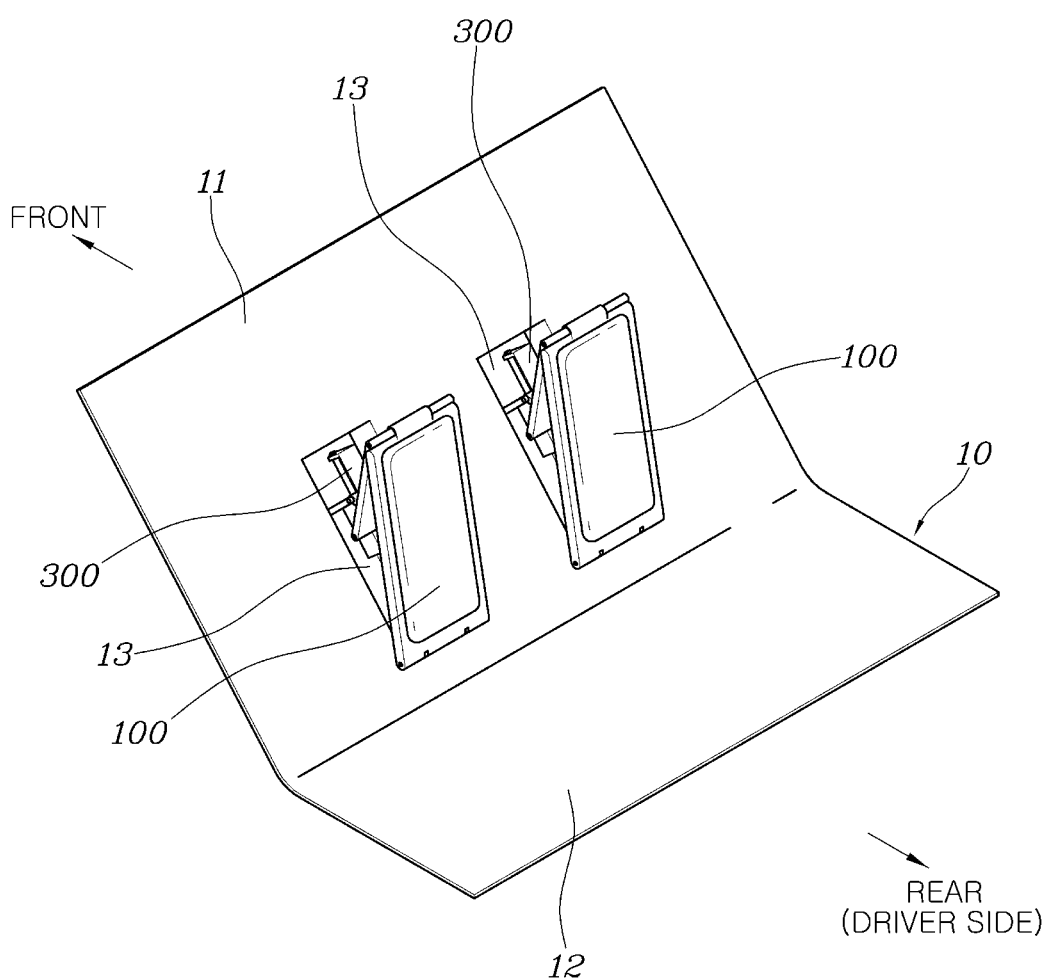
FIGS. 13 to 15 are views illustrating the pedal pad according to the present invention in a pop-up state.
Figure 14:
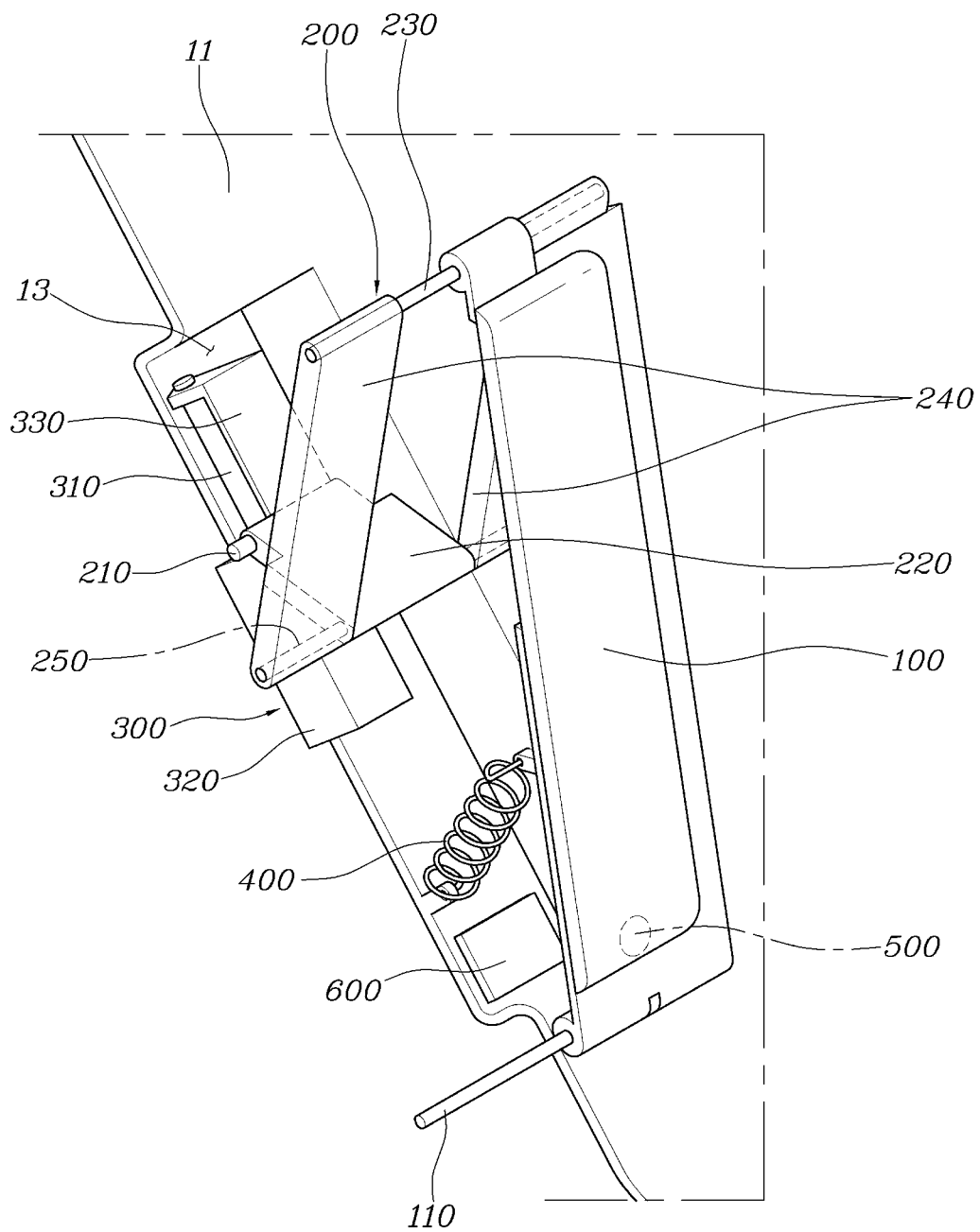
Figure 15:
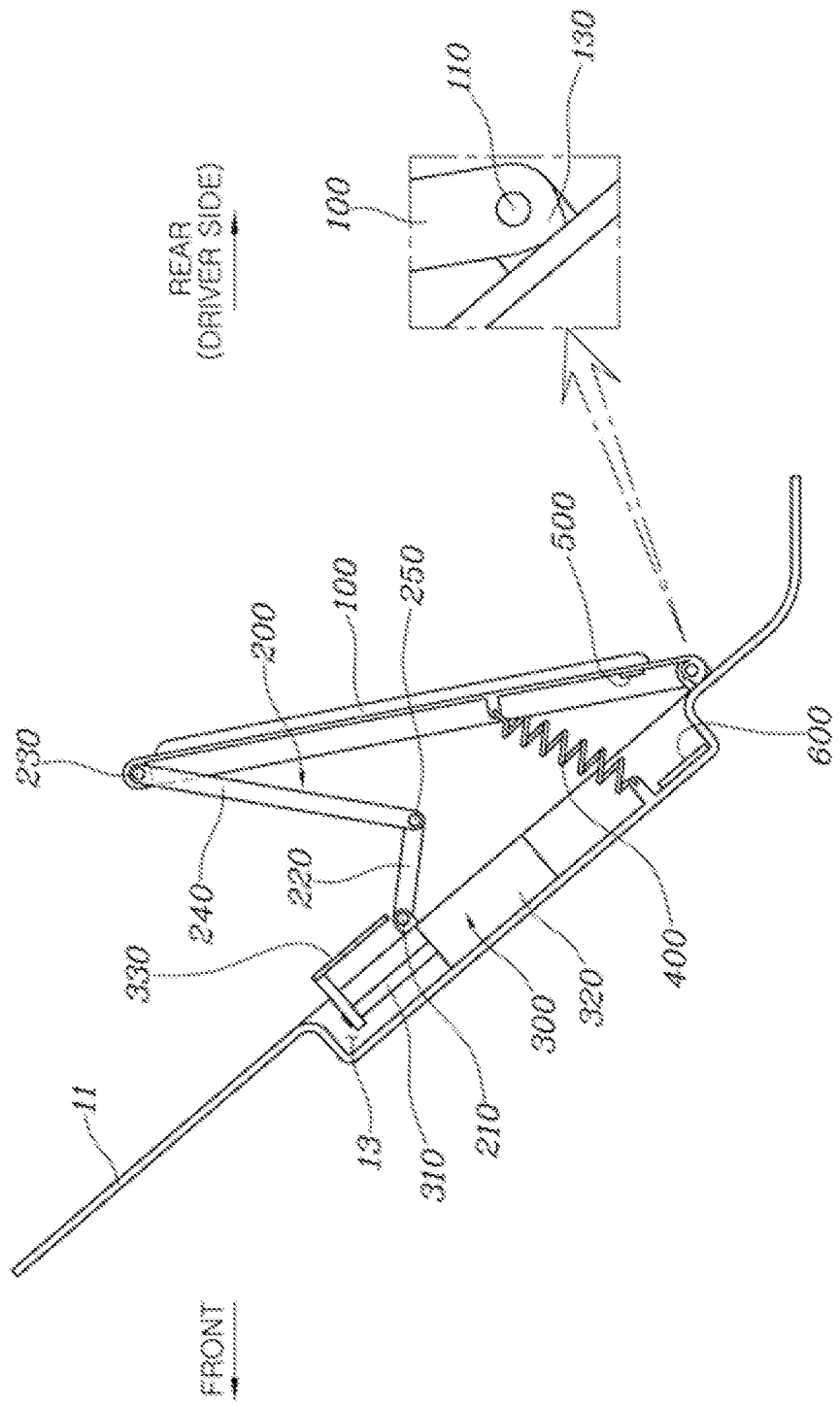

Further, when the pedal pads 100 are rotated rearwards and thus protrude towards the interior of the vehicle by operating the actuators 300, the pedal pads 100 are exposed to the driver and thus enter the pop-up state in which the pedal pads 100 are manipulable by the driver (with reference to FIGS. 13 to 15). The foldable pedal apparatus for vehicles according to the present invention may further include return springs 400 installed with both ends supported by the footrest panel 10 and the pedal pads 100 and configured to provide spring force to the pedal pads 100 to rotate the pedal pads 100 rearwards and thus to enter the pop-up state.

When the pedal pads 100 are rotated forwards by the driver, the return springs 400 are compressed and thus accumulate elastic force and, when force applied to the pedal pads 100 by the driver is released, the return springs 400 are uncompressed and thus return to original positions, and in this case, the pedal pads 100 return to the initial positions thereof due to the elastic force from the return springs 400. The return springs 400 may be coiled springs, and the pedal effort of the pedal pads 100 may be tuned by tuning the spring force of the return springs 400.

The foldable pedal apparatus for vehicles according to the present invention may include two pedal devices having the same configuration, i.e., each of which includes the pedal pad 100, the link unit 200, the actuator 300 and the return spring 400, and the two pedal devices are installed on the footrest panel 10 to be laterally spaced apart from each other. Among the two pedal devices installed on the footrest panel 10 to be laterally spaced apart from each other, one pedal device is used as an accelerator pedal device, and a remaining pedal device is used as a brake pedal device.

In one embodiment of the present invention, referring to FIG. 1, the pedal pad 100 located on the right side of the footrest panel 10 may be used as the pedal pad 101 of the accelerator pedal device, and the pedal pad 100 located on the left side of the footrest panel 10 may be used as the pedal pad 102 of the brake pedal device.

Each of the pedal pads 100 is an organ-type pedal pad provided with the lower end rotatably combined with the footrest panel 10 via a hinge pin 10, a portion located above the hinge pin 110 to be connected to a corresponding one of the return springs 400, and the upper end rotated forwards and rearwards about the hinge pin 110.

The organ-type pedal pad has advantages, such as ease and convenience in operation, compared to a pendent-type pedal pad. Each of the link units 200 according to the present invention includes a first link 220 rotatably combined with the footrest panel 10 via a first link pin 210, second links 240 rotatably combined with the upper end of the pedal pad 100 via a second link pin 230, and a connection pin 250 configured to rotatably connect the first link 220 and the second links 240.

In the present invention, when the first link 220 and the second links 240 are rotated to be folded towards each other, the pedal pad 100 is rotated towards the front surface 11 of the footrest panel 10 and thus enters the hidden state (with reference to FIG. 12), and when the first link 220 and the second links 240 are rotated to be unfolded from each other, the pedal pad 100 is rotated rearwards and thus enters the pop-up state (with reference to FIG. 15).

In particular, the second links 240 of each of the link units 200 include two second links 240 provided at both sides of the first link 220 and connected to the pedal pad 100 via the second link pin 230 and the connection pin 250. The two second links 240 may secure robustness and operation safety of the pedal pad 100.

Each of the actuators 300 according to the present invention includes a linear motor 320 provided with a motor rod 310 fixedly installed on the footrest panel 10 to be moved forwards and rearwards, and a foldable guide 330 connected to the motor rod 310 and configured to come into contact with the first link 220 when the motor rod 310 is moved rearwards and to release contact with the first link 220 when the motor rod 310 is moved to protrude.

The linear motor 320 is electrically connected to a power supply, and the motor rod 310 is moved forwards to protrude from the linear motor 320 or is moved rearwards to be inserted into the linear motor 320 when the linear motor 320 is operated. Operation of the linear motor 320 is controlled by a PCB 600 which will be described below.

When the motor rod 310 and the foldable guide 330 are moved rearwards by operating the linear motor 320, the end of the foldable guide 330 comes into contact with the first link 220 and thus pulls the first link 220 towards the linear motor 320, the first link 220 and the second links 240 are rotated to be folded towards each other by the pulling force of the foldable guide 330, and the pedal pad 100 is rotated towards the front surface 11 of the footrest panel 10 by rotation of the first link 220 and the second links 240 and thus enters the hidden state.

On the other hand, when the motor rod 310 and the foldable guide 330 are moved forwards by operating the linear motor 320, contact of the foldable guide 330 with the first link 220 is released, the pedal pad 100 is rotated about the hinge pin 110 by the spring force of the return spring 400 to protrude rearwards and thus enters the pop-up state, and simultaneously, the first link 220 and the second links 240 are rotated to be unfolded from each other.

The foldable guide 330 according to the present invention is formed in an L shape with a first end thereof connected to the motor rod 310 and a second end thereof that protrudes towards the pedal pad 100. A guide groove 120 configured to extend in the length direction of the pedal pad 100 is formed in the front surface of the pedal pad 100 facing the foldable guide 300, and the second end of the foldable guide 330 is inserted into the guide groove 120 so that the guide groove guides rectilinear movement of the foldable guide 330.

When the pedal pad 100 is rotated forwards and rearwards and is thus converted between the hidden state and the pop-up state by operating the linear motor 320, the foldable guide 330 is moved along the guide groove 120 and thereby, the guide groove 120 guides rectilinear movement of the foldable guide. The second end of the foldable guide 330 is located in the guide groove 120 in the hidden state of the pedal pad 100 (with reference to FIG. 12), and the second end of the foldable guide 330 is released from the guide groove 120 in the pop-up state of the pedal pad 100 (with reference to FIG. 15).

In the present invention, panel recesses 13 configured to protrude forwards and to be open rearwards are formed in the front surface 11 of the footrest panel 10, and the linear motors 320 are fixedly installed to be inserted into the panel recesses 13. The lower ends of the return springs 400 are fixedly installed in the panel recesses 13, and the PCBs 600 which will be described below are fixedly installed in the panel recesses 13.

Figure 12:
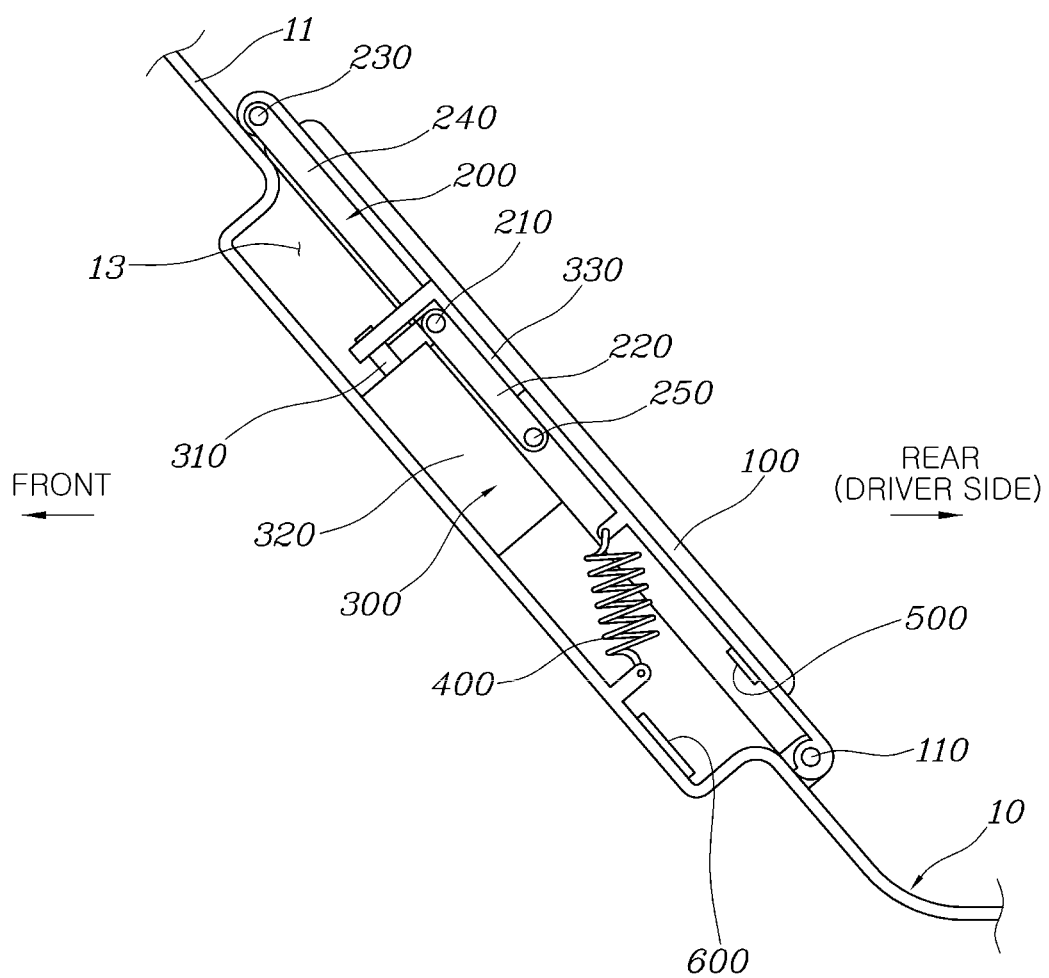

As shown in FIG. 12, when the pedal pads 100 are in the hidden state, the first link 220, the second links 240 and the foldable guide 330 are inserted into each of spaces between the panel recesses 13 and the panel pads 100 to prevent exposure and are thus not exposed to driver's or passenger's view inside the vehicle, and thereby, the interior design of the vehicle may be maximally improved.

Further, since the link units 200 and the actuators 300 corresponding to operating devices of the foldable pedal apparatus are hidden in the panel recesses 13, spaces configured to hide the link units 200 and the actuators 300 may be minimized, and thereby, the space of the interior of the vehicle and the space of an engine compartment may be maximally assured.

In addition, no holes connected to the engine compartment are formed in the footrest panel 10 to install and operate the foldable pedal apparatus for vehicles according to the present invention, and thereby, inflow of noise and foreign substances and penetration of moisture into the interior of the vehicle may be maximally prevented.

Moreover, when the pedal pads 100 according to one embodiment of the present invention are in the hidden state, the panel recesses 13 are shielded by the pedal pads 100 and thus exposure of the panel recesses 13 is interrupted, and thereby, the interior design of the vehicle may be maximally improved. According to the present invention, as shown in FIG. 15, a stopper 130 configured to protrude outwards is provided at the lower end of the pedal pad 100, and the pop-up position of the pedal pad 100 is determined by contact of the stopper 130 with the footrest panel 10 in the pop-up state of the pedal pad 100.

The foldable pedal apparatus for vehicles according to one embodiment of the present invention may further include permanent magnets 500 combined with the pedal pads 100, and the printed circuit boards (PCBs) 600 fixedly installed on the footrest panel to face the permanent magnets 500, and each of the PCBs 600 may be configured to detect the rotating angle of a corresponding one of the pedal pads 100 through a magnetic flux change based on a position change of a corresponding one of the permanent magnets 500 when the pedal pads 100 are rotated, and generate a signal related to pedal functions.

The signal related to the pedal functions is a signal related to braking of the vehicle or a signal related to acceleration of the vehicle. The PCBs 600 may be configured to control driving of the linear motors 320, and are electrically connected to a power supply, such as a battery. The PCBs 600 may be fixedly installed to be inserted into the panel recesses 13 formed in the front surface 11 of the footrest panel 10.

FIGS. 1 and 2 and FIGS. 11 and 12 illustrate state in which the pedal pads 100 are rotated forwards to be located maximally close to the front surface 11 of the footrest panel 10 by operating the linear motors 320, and in this case, exposure of the pedal pads 100 towards the driver is interrupted and thus the pedal pads 100 enter the hidden state in which the pedal pads 100 are non-manipulable by the driver.

When the pedal pads 100 are in the hidden state, the foldable guides 330 are moved rearwards and come into contact with the first links 220, and the first link 220 and the second links 240 of each of the link units 200 are mutually rotated to be folded towards each other. When the pedal pads 100 are in the hidden state, the first link 220, the second links 240 and the foldable guide 330 are inserted into each of the spaces between the panel recesses 13 and the panel pads 100 to prevent exposure and are thus not exposed to driver's or passenger's view inside the vehicle, and thereby, the interior design of the vehicle may be maximally improved.

Further, since the link units 200 and the actuators 300 corresponding to the operating devices of the foldable pedal apparatus are hidden in the panel recesses 13 of the footrest panel 10, the spaces configured to hide the link units 200 and the actuators 300 may be minimized, and thereby, the space of the interior of the vehicle and the space of the engine compartment may be maximally assured. Moreover, in the hidden state of the pedal pads 100, the panel recesses 13 are shielded by the pedal pads 100 and thus exposure of the panel recesses 13 is interrupted, and thereby, the interior design of the vehicle may be maximally improved.

In addition, when the pedal pads 100 are in the hidden state, a space under the driver's seat may be widened without interference with the pedals and thus allow the driver to comfortably rest in a relaxation mode, and erroneous operation of the pedals may be prevented in the autonomous driving situation and thus facilitate safety improvement.

FIGS. 13 to 15 illustrate a state in which the motor rods 310 and the foldable guides 330 are moved forwards by operating the linear motors 320, contact of the foldable guides 330 with the first links 220 is released, the pedal pads 100 are rotated rearwards about the hinge pins 110 in the above-described hidden state so as to protrude towards the interior of the vehicle, and in this case, the pedal pads 100 are exposed to the driver and thus enter the pop-up state in which the pedal pads 100 are manipulable by the driver. In the pop-up state of the pedal pads 100, the first link 220 and the second links 240 of each of the link units 200 are unfolded from each other.

Figure 16:
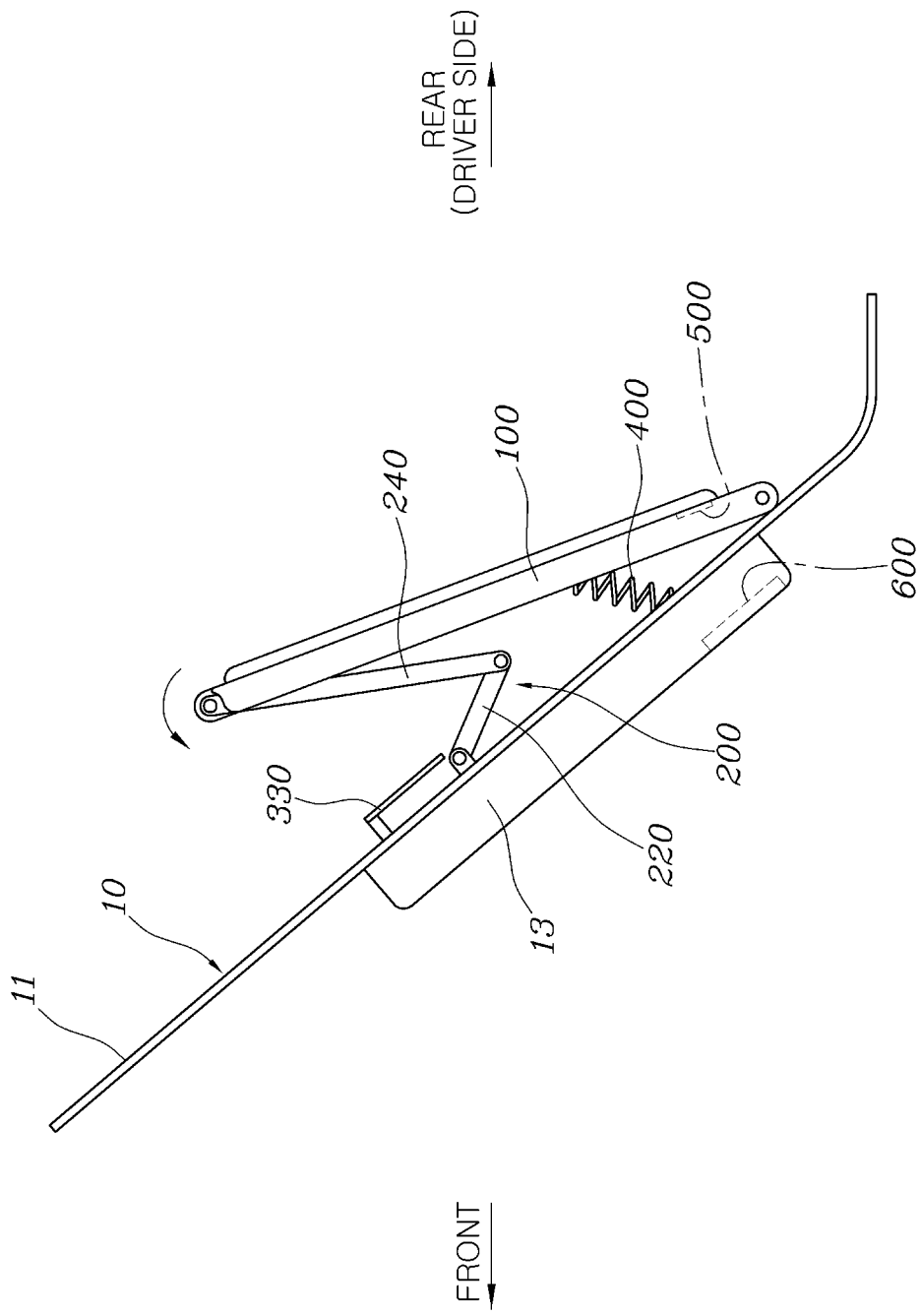
FIG. 16 is a side view illustrating a state in which the pop-up pad is moved forwards by driver operation, and is thus normally operated.

FIG. 16 is a view illustrating the state in which the pop-up pedal pad 100 is depressed or engaged by a driver foot, and is thus normally rotated forwards. As described above, when the pedal pad 100 is in the pop-up state, the driver depresses or engages the protruding pedal pad 100, and thus, the pedal pad 100 is operated normally. When the pedal pad 100 is operated normally, the pedal effort of the pedal pad 100 may be achieved through the return spring 400.

When the pedal pad 100 is moved forwards by operation of the driver, the permanent magnets 500 are moved together with the pedal pad 100, and the PCB 600 may be configured to detect a stroke change (rotating angle) of the pedal pad 100 through a magnetic flux change based on a position change of the permanent magnets 500 when the permanent magnets 500 are moved, and generate the signal related to the pedal functions (e.g., a signal related to braking of the vehicle or a signal related to acceleration of the vehicle).

In one embodiment of the present invention, when the positions of the permanent magnets 500 are changed while rotating the pedal pads 100 to enter the hidden state or the pop-up state by operating the linear motors 320, the PCBs 600 do not generate the signal related to the pedal functions (e.g., a signal related to braking of the vehicle or a signal related to acceleration of the vehicle) to prevent erroneous operation.

Figure 11:
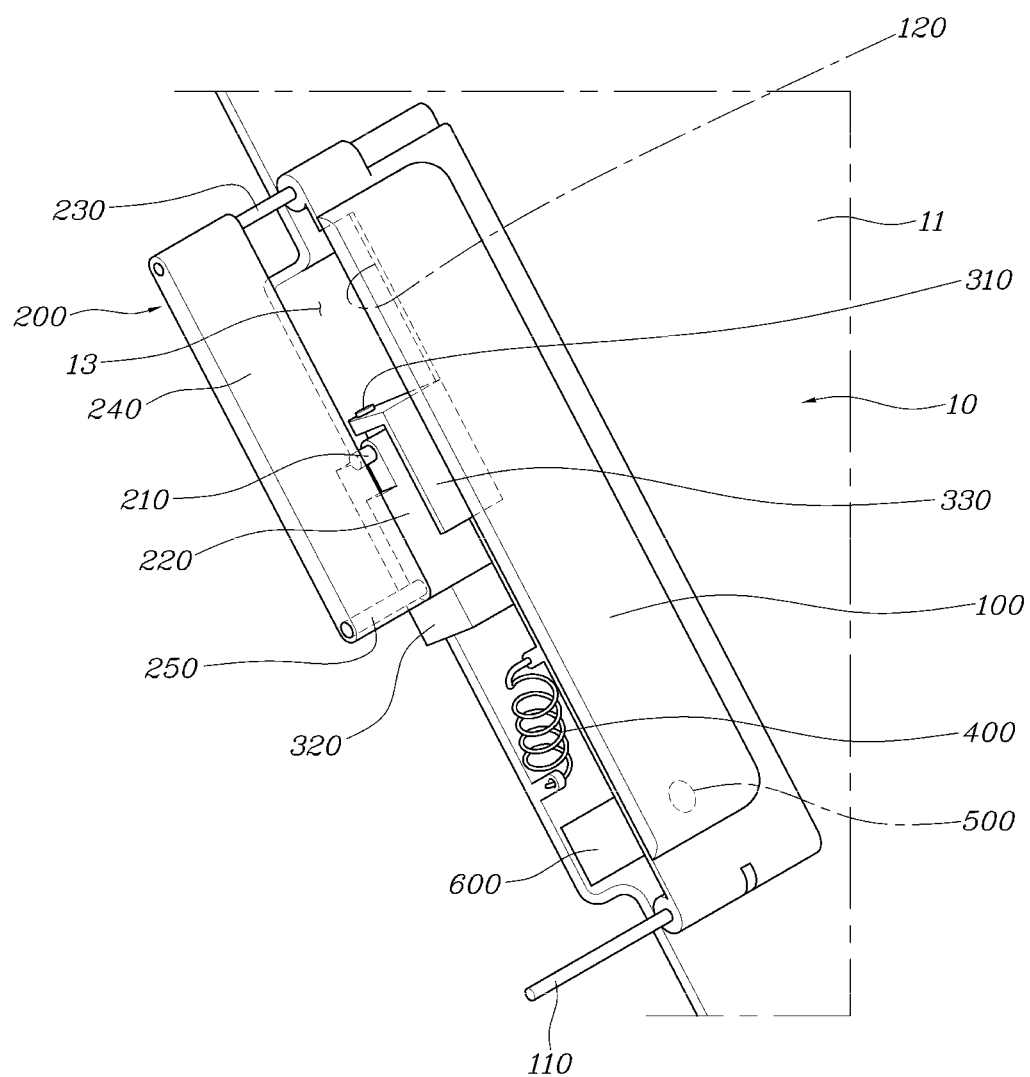
FIGS. 11 and 12 are views illustrating the pedal pad according to the present invention in the hidden state.

In other words, when the pedal pads 100 are converted into the hidden state shown in FIGS. 11 and 12 or into the pop-up state shown in FIGS. 13 to 15 by operating the linear motors 320, although the positions of the permanent magnets 500 are changed, the PCBs 600 do not generate the signal related to the pedal functions, thereby preventing an accident due to erroneous operation.

However, only when the positions of the permanent magnets 500 are changed due to rotation of one of the pedal pads 100 by driver operation in a situation in which the linear motors 320 are not operated in the pop-up state of the pedal pads 100, a corresponding one of the PCBs 600 generates the signal related to the pedal functions, thereby being capable of facilitating more stable operation of the foldable pedal apparatus.

As described above, in the foldable pedal apparatus for vehicles according to the present invention, the pedal pads 100 are rotated rearwards and are popped up to the driver to be operated by the driver in the manual driving mode in which the driver directly drives or operates a vehicle, and the pedal pads 100 are hidden and are thus not exposed to the driver not to be operated by the driver in the autonomous driving mode, to enable the driver to comfortably rest in the autonomous driving situation and to promote safety improvement through interruption of erroneous operation of pedals in the autonomous driving situation.

Further, in the foldable pedal apparatus for vehicles according to the present invention, in the hidden state of the pedal pads 100, the link units 200 and the actuators 300 corresponding to the operating devices are inserted into the panel recesses 13 of the footrest panel 10 to be hidden therein, the panel recesses 13 are shielded by the pedal pads 100 and thus exposure of the panel recesses 13 is interrupted, and thereby, the spaces configured to hide the link units 200 and the actuators 300 may be minimized, and thereby, the space of the interior of the vehicle and the space of the engine compartment may be maximally assured and the interior design of the vehicle may be maximally improved.

In addition, no holes connected to the engine compartment are formed in the footrest panel 10 to install and operate the foldable pedal apparatus for vehicles according to the present invention, and thereby, inflow of noise and foreign substances and penetration of moisture into the interior of the vehicle may be maximally prevented.

As is apparent from the above description, in a foldable pedal apparatus for vehicles according to the present invention, pedal pads are rotated rearwards and are popped up to a driver to be operated by the driver in a manual driving mode in which the driver directly drives a vehicle, and the pedal pads are hidden and are thus not exposed to the driver not to be operated by the driver in an autonomous driving situation, to enable the driver to comfortably rest in the autonomous driving situation and to promote safety improvement through interruption of erroneous operation of pedals in the autonomous driving situation.

Further, in the foldable pedal apparatus for vehicles according to the present invention, in the hidden state of the pedal pads, link units and actuators corresponding to the operating devices are inserted into panel recesses of a footrest panel to be hidden therein, the panel recesses are shielded by the pedal pads and thus exposure of the panel recesses is interrupted, and thereby, spaces configured to hide the link units and the actuators may be minimized, and thereby, the space of the interior of the vehicle and the space of an engine compartment may be maximally assured and the interior design of the vehicle may be maximally improved.

In addition, no holes connected to the engine compartment are formed in the footrest panel to install and operate the foldable pedal apparatus for vehicles according to the present invention, and thereby, inflow of noise and foreign substances and penetration of moisture into the interior of the vehicle may be maximally prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A foldable pedal apparatus for vehicles, comprising:
   pedal pads rotatably combined with a footrest panel, rotated towards a front surface of the footrest panel to enter a hidden state, in which the pedal pads are nonmanipulable by a driver, in an autonomous driving mode, and rotated rearwards to enter a pop-up state, in which the pedal pads are exposed to the driver to be manipulable by the driver, in a manual driving mode;
   link units configured to connect the pedal pads to the footrest panel and rotated together with the pedal pads; and
   actuators fixed to the footrest panel, configured to come into contact with the link units and to release contact with the link units, and configured to rotate the pedal pads towards the front surface of the footrest panel to allow the pedal pads to enter the hidden state when the actuators are operated to come into contact with the link units.

2. The foldable pedal apparatus for vehicles according to claim 1, further comprising return springs installed with opposed ends supported by the footrest panel and the pedal pads, and configured to provide spring force to the pedal pads to rotate the pedal pads rearwards and thus to enter the pop-up state.

3. The foldable pedal apparatus for vehicles according to claim 2, wherein two pedal devices having the same configuration, each pedal device including one of the pedal pads, one of the link units, one of the actuators and one of the return springs, are installed on the footrest panel to be laterally spaced apart from each other.

4. The foldable pedal apparatus for vehicles according to claim 3, wherein a first of the two pedal devices installed on the footrest panel to be laterally spaced apart from each other is used as an accelerator pedal device, and a second of the two pedal devices is used as a brake pedal device.

5. The foldable pedal apparatus for vehicles according to claim 2, wherein each of the pedal pads is an organ type pedal pad provided with a lower end rotatably combined with the footrest panel via a hinge pin, a portion located above the hinge pin to be connected to a corresponding one of the return springs, and an upper end rotated forwards and rearwards about the hinge pin.

6. The foldable pedal apparatus for vehicles according to claim 1, wherein each of the link units includes:
   a first link rotatably combined with the footrest panel via a first link pin;
   second links rotatably combined with an upper end of a corresponding one of the pedal pads via a second link pin; and
   a connection pin configured to rotatably connect the first link and the second links,
   wherein, when the first link and the second links are rotated to be folded towards each other, the corresponding one of the pedal pads is rotated towards the front surface of the footrest panel and thus enters the hidden state, and when the first link and the second links are rotated to be unfolded from each other, the corresponding one of the pedal pads is rotated rearwards and thus enters the pop-up state.

7. The foldable pedal apparatus for vehicles according to claim 6, wherein the second links of each of the link units include two second links provided at opposed sides of the first link and connected to the corresponding one of the pedal pads via the second link pin and a connection pin.

8. The foldable pedal apparatus for vehicles according to claim 6, wherein each of the actuators comprises:
   a linear motor provided with a motor rod, fixedly installed on the footrest panel, and allowing the motor rod to be moved forwards and rearwards; and
   a foldable guide connected to the motor rod and configured to come into contact with the first link when the motor rod is moved rearwards and to release contact with the first link when the motor rod is moved to protrude.

9. The foldable pedal apparatus for vehicles according to claim 8, wherein, when the foldable guide is moved rearwards and thus comes into contact with the first link, the first link and the second links are rotated to be folded towards each other, and the corresponding one of the pedal pads is rotated towards the front surface of the footrest panel and thus enters the hidden state.

10. The foldable pedal apparatus for vehicles according to claim 8, wherein, when the foldable guide is moved forwards and thus contact of the foldable guide with the first link is released, the corresponding one of the pedal pads is rotated about the hinge pin by spring force of a corresponding one of the return springs to protrude rearwards and thus enters the pop-up state.

11. The foldable pedal apparatus for vehicles according to claim 8, wherein:
   a guide groove configured to extend in a length direction of the pedal pads is formed in the front surface of each of the pedal pads; and
   one end of the foldable guide is inserted into the guide groove so that the guide groove guides rectilinear movement of the foldable guide.

12. The foldable pedal apparatus for vehicles according to claim 8, wherein:
   panel recesses configured to protrude forwards and to be open rearwards are formed in the front surface of the footrest panel;
   the linear motors are fixedly installed to be inserted into a corresponding one of the panel recesses; and
   when the pedal pads are in the hidden state, each of the first link, the second links and the foldable guide, respectively, are inserted into spaces between the panel recesses and the panel pads so as not to be exposed.

13. The foldable pedal apparatus for vehicles according to claim 12, wherein, when the pedal pads are in the hidden state, the panel recesses are shielded by the pedal pads to prevent exposure thereof.

14. The foldable pedal apparatus for vehicles according to claim 12, further comprising:
   permanent magnets combined with the respective pedal pads; and
   printed circuit boards (PCBs) fixedly installed on the footrest panel to face the permanent magnets,
   wherein each of the PCBs is configured to detect a rotating angle of a corresponding one of the pedal pads through a magnetic flux change of the permanent magnets when the pedal pads are rotated, and generates a signal related to pedal functions.

15. The foldable pedal apparatus for vehicles according to claim 14, wherein, when positions of the permanent magnets are changed while rotating the pedal pads to enter the hidden state or the pop-up state by operating the actuators, the PCBs do not generate the signal related to the pedal functions to prevent erroneous operation.

16. The foldable pedal apparatus for vehicles according to claim 14, wherein, when positions of the permanent magnets are changed due to rotation of one of the pedal pads by driver operation in a situation in which the linear motors are not operated in the pop-up state of the pedal pads, a corresponding one of the PCBs generates the signal related to the pedal functions.

17. The foldable pedal apparatus for vehicles according to claim 1, wherein a stopper is provided at a lower end of each of the pedal pads, wherein, when the pedal pads are in the pop-up state, a pop-up position of each of the pedal pads is determined by contact between the stopper and the footrest panel.

* * * * *